United States Patent

Kaneko et al.

Patent Number: 5,633,680
Date of Patent: May 27, 1997

[54] FOCUS CONTROL DEVICE HAVING IMPROVED SENSITIVITY CHARACTERISTICS

[75] Inventors: Keiji Kaneko; Shinya Yajima; Hiroyuki Kawamura; Hiroshi Kato, all of Omiya, Japan

[73] Assignee: Fuji Photo Optical Co., Ltd., Omiya, Japan

[21] Appl. No.: 376,686

[22] Filed: Jan. 23, 1995

Related U.S. Application Data

[63] Continuation of Ser. No. 160,284, Dec. 2, 1993, abandoned, which is a continuation of Ser. No. 772,773, Oct. 7, 1991, abandoned.

[30] Foreign Application Priority Data

Oct. 8, 1990 [JP] Japan .................. 2-268487
Dec. 21, 1990 [JP] Japan .................. 2-412565

[51] Int. Cl.$^6$ ........................................ H04N 5/225
[52] U.S. Cl. ............................. 348/357; 348/375
[58] Field of Search ........................ 348/207, 345, 348/346, 348, 351, 357; 354/195.1, 195.12, 195.13; 359/696, 694, 998, 995, 997, 823, 824; H04N 5/232

[56] References Cited

U.S. PATENT DOCUMENTS

| | | | |
|---|---|---|---|
| 3,522,981 | 8/1970 | Kirstein et al. | 354/195.1 |
| 4,567,526 | 1/1986 | Tsuchiya | 358/227 |
| 4,825,237 | 4/1989 | Hatase et al. | 354/402 |
| 4,973,215 | 11/1990 | Kitamura et al. | 354/195.1 |
| 5,067,802 | 11/1991 | Orino | 359/700 |

FOREIGN PATENT DOCUMENTS

| | | | |
|---|---|---|---|
| 63-167334 | 7/1988 | Japan | G03B 3/00 |
| 2-154212 | 6/1990 | Japan | . |
| 3-179308 | 8/1991 | Japan | G02B 7/09 |

*Primary Examiner*—Andrew Faile
*Assistant Examiner*—Tuan V. Ho
*Attorney, Agent, or Firm*—Oblon, Spivak, McClelland, Maier & Neustadt, P.C.

[57] ABSTRACT

A focus control device of the type including a first sensor circuit arranged to detect the degree of manipulation of a focus operating circuit to produce a lens displacement command signal, a second sensor circuit arranged to detect the current position of a focusing lens to produce a signal indicative of a current lens position, and a comparator arranged to compare the output signals of the first and second sensor circuit to produce a servo control signal according to a difference between the two sensor signals thereby to control the operation of the focusing lens, characterized in that the focus control device comprises an output signal characteristics converting circuit adapted to convert the characteristics of the servo control signal into compliance with a characteristics curve varying with high- and low-pitch inclinations toward the nearest subject distance and infinite ends of the focusing range, respectively.

6 Claims, 4 Drawing Sheets

FOCUS CONTROL DEVICE HAVING IMPROVED SENSITIVITY CHARACTERISTICS

This application is a continuation of application Ser. No. 08/160,284, filed on Dec. 2, 1993, now abandoned, which is a Continuation of application Ser. No. 07/772,773, filed on Oct. 7, 1991, now abandoned.

BACKGROUND OF THE INVENTION

1. Field of the Art

This invention relates to a focus demand for use on a television camera or the like.

2. Description of the Prior Art

In television cameras, the focusing lens is usually driven through a servo means including a drive member like a motor and a control mechanism which controls the operation of the drive member. The servo means is associated with a focus demand which supplies a control signal to a control section of the servo means. Generally, the focus demand is largely constituted by a focus operating means in the form of a handle or the like which is manually operated by an operator, and a sensor means like a potentiometer which is arranged to detect the extent of the manual operating efforts exerted on the focus operating means and to produce an electric signal proportional to the extent of the operating efforts. The output signal of the sensor means is applied as a servo control signal to the control section of the servo means to operate the drive member according to the servo control signal for a focusing operation in a range from the nearest subject distance to infinite.

In this connection, the displacement of the focusing lens is not in linear relation with the subject distance, and varies in the fashion of an exponential function. Accordingly, if the focusing lens is moved in proportion to the extent of manual efforts on the focus operating means, the sensitivity of the focusing operation becomes overly high toward the infinite end of the focusing range to make delicate or fine focusing operations difficult. Conversely, the response of the focusing lens to the manipulation of the focus operating means becomes lower toward the nearest subject distance position. The focus maneuverability at the infinite position can be improved by broadening the operating stroke range of the focus operating means. On the other hand, the response of the focusing lens to the focus operating means can be improved by narrowing the operating stroke range of the latter. However, a broadened operating stroke range of the focus operating means will further deteriorate the response of the focusing lens at or in the vicinity of the nearest subject distance. On the contrary, a narrowed operating stroke range will further increase the sensitivity at or in the vicinity of the infinite position to deteriorate the maneuverability of the focusing lens to a considerable degree. Namely, neither of these measures can improve the focus maneuverability over the entire focusing range from the nearest subject distance to infinite.

In an attempt to overcome these problems in focusing operations, there have been developed mechanisms which are designed to switch the stroke range of the focus operating means in such a manner as to broaden the stroke range in focusing operations at or near the infinite position and to narrow the stroke range in operations at or in the vicinity of the nearest subject distances position, as described in Japanese Laid-Open Patent Application 2-154212.

In this manner, the focus maneuverability by the focus control device can be improved to a certain degree by changing the drive rate per unit stroke length of the focus operating means according to the subject distance. However, it is often found troublesome and annoying for an operator to switch the drive rate while operating a camera. Besides, even if the effective stroke range of the focus operating means is varied stepwise to provide two or three different focus drive rates, it is still difficult to improve the focus maneuverability to a sufficient degree over the entire focusing range from the nearest subject distance to the infinite position, thus limiting the overall improvement of the focus maneuverability of the focus control device.

SUMMARY OF THE INVENTION

In view of the foregoing situations, it is an object of the present invention to improve the focus maneuverability of the focus demand.

In accordance with the present invention, there is provided, for achieving the above-stated objective, a focus demand of the type including a first sensor means arranged to detect the degree of manipulation of a focus operating means to produce a lens displacement command signal, a second sensor means arranged to detect the current position of a focusing lens to produce a signal indicative of a current lens position, and a comparator arranged to compare the output signals of the first and second sensor means to produce a servo control signal according to a difference between the two signals thereby to control the operation of the focusing lens, characterized in that the focus demand comprises an output signal characteristics converting means adapted to convert the characteristics of the servo control signal into compliance with a characteristics curve varying with high-and low-pitch inclinations toward the nearest subject distance and the infinite end of the focusing range, respectively.

BRIEF DESCRIPTION OF THE DRAWINGS

The above and other objects, features and advantages of the invention will become apparent from the following description and the appended claims, taken in conjunction with the accompanying drawings which show by way of example some preferred embodiments of the invention and in which:

PARTICULAR DESCRIPTION OF THE INVENTION

Hereafter, the invention is described more particularly by way of preferred embodiments with reference to the accompanying drawings.

Figure 1:
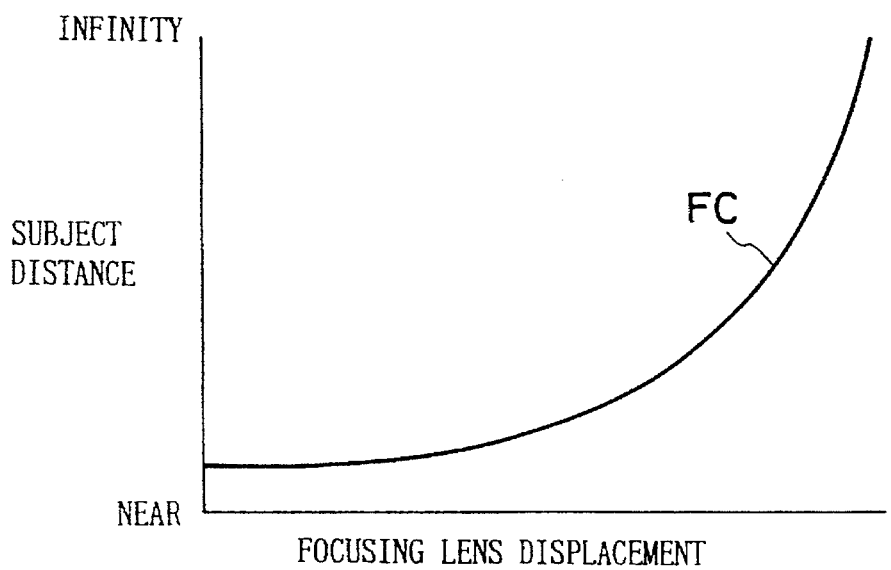
FIG. 1 is a diagram of focus curve.

FIG. 1 diagrammatically shows the relationship between the subject distance and the focusing lens displacement. As clear therefrom, the focus curve FC varies in the fashion of exponential function. Accordingly, as mentioned hereinbefore, if the focusing lens is moved in proportion to the extent of manipulation of a focus operating means, the sensitivity of the focusing operation becomes too high at the infinite end of the focusing range to make fine focus adjustments. On the contrary, at the nearest subject distance position, the response of the focusing lens to the efforts on the focus operating means becomes too slow.

Figure 2:
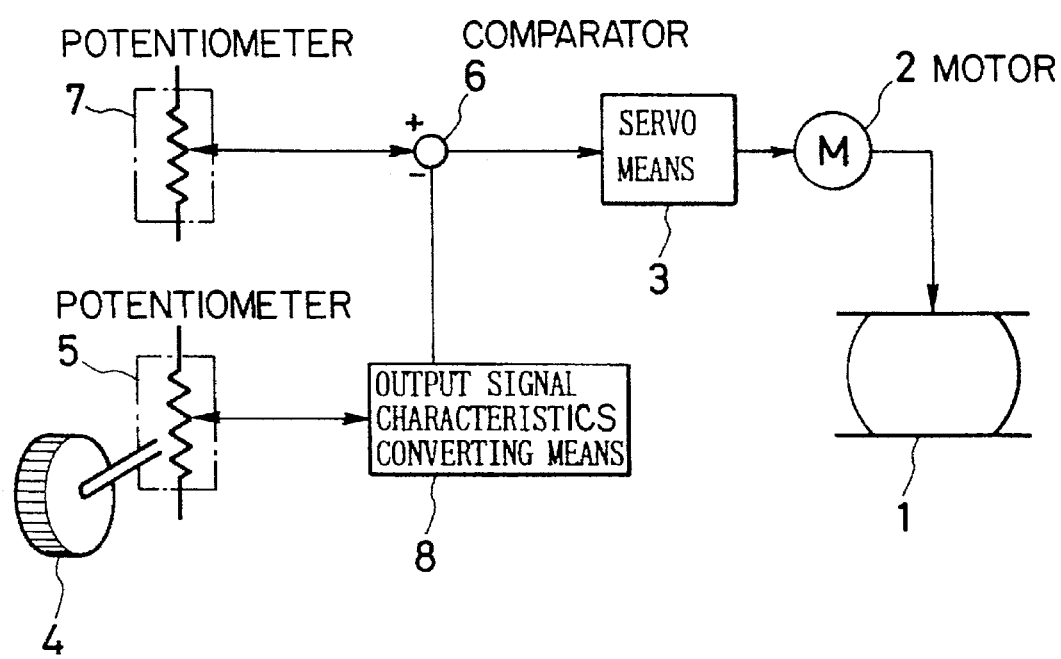
FIG. 2 is a diagrammatic illustration of a basic configuration of focus control.

Referring now to FIG. 2, there is illustrated a basic arrangement of the focus control according to the invention, in which indicated at 1 is a focusing lens, at 2 is a drive motor for the focusing lens 1, and at 3 is a servo means for controlling the operation of the drive motor 2. The reference 4 denotes a focus operating means which is constituted by a rotary lever, a rotary drum or the like to be manually operated by the cameraman. The extent of the operating efforts exerted on the focus operating means is detected and converted into an electric signal by a potentiometer 5 which is employed as a focusing operation sensor, the output electric signal of the potentiometer 5 being supplied to a comparator 6 as a lens displacement signal. The comparator 6 is also supplied with a current lens position signal from a lens position sensor or a potentiometer 7 which is interlocked with the focusing lens 1 to detect its current position. The difference between the output signals of the two potentiometers 5 and 7 is computed at the comparator 6, and a voltage signal corresponding to the difference is applied to the servo means 3 thereby to control the operation of the drive motor 2 for the focusing lens 1.

Indicated at 8 is an output signal characteristics converting means which functions to convert characteristics of the lens displacement command signal from the potentiometer 5 according to a characteristics curve varying with high- and low-pitched inclinations toward the nearest subject distance position and the infinite end of the focusing range, respectively. The output signal characteristics converting means 8 is arranged as shown in FIG. 3.

Figure 3:
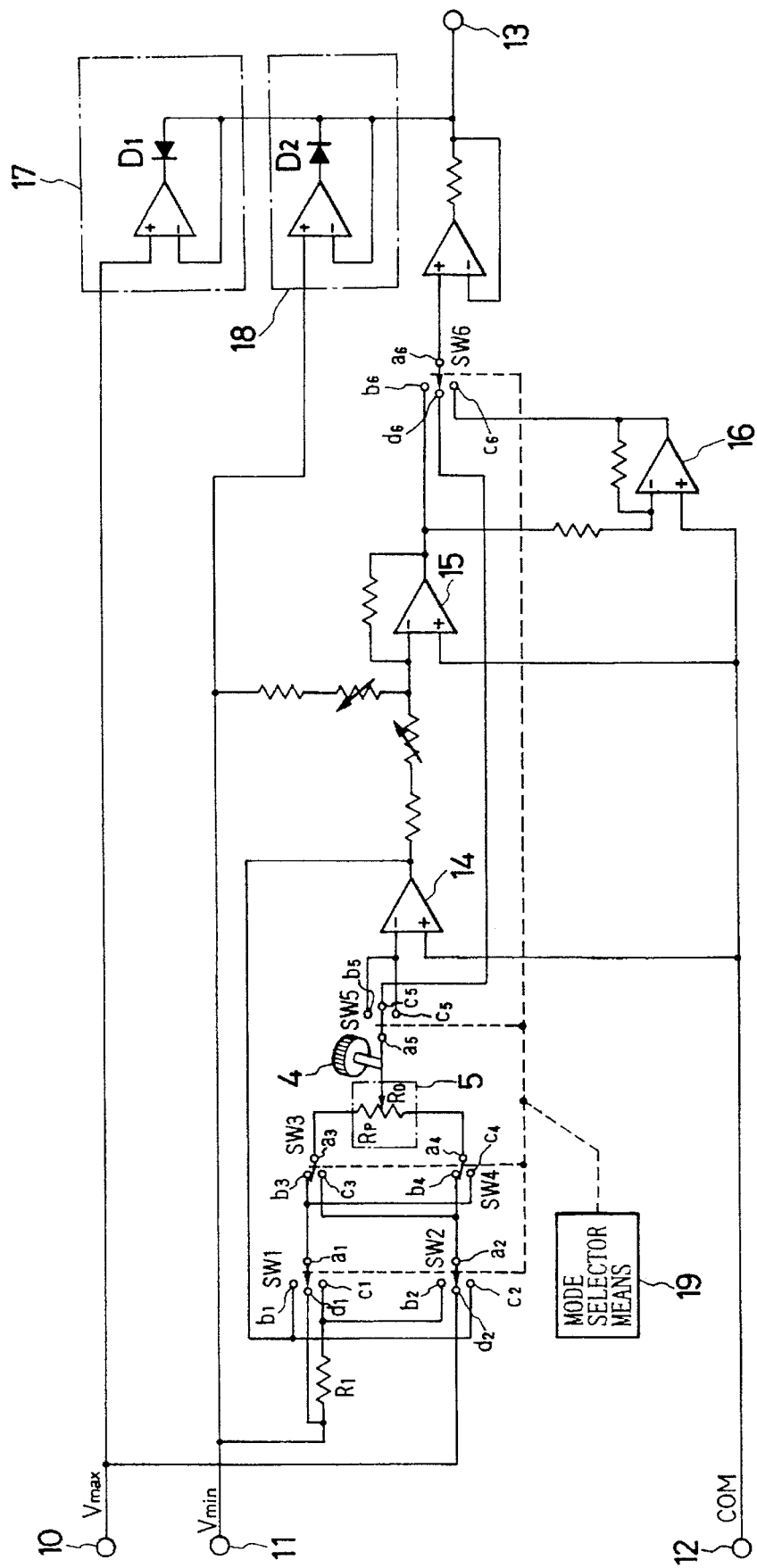
FIG. 3 is a circuit diagram of a focus control device in a first embodiment of the invention.

In FIG. 3, the output signal characteristic converting means 8 includes an upper limit terminal 10, a lower limit terminal 11, a common terminal 12 and an output terminal 13. The upper and lower limit terminals 10 and 11 correspond to the opposite ends of the displacement range of the focusing lens 1, and are supplied with voltages $V_{max}$ and $V_{min}$, respectively. On the other hand, a predetermined voltage signal is supplied to the common terminal 12. Indicated at 14 is a comparator, at 15 and 16 are inverting amplifiers, and at 17 and 18 are upper and lower limiters. Further, indicated at $R_1$ is a resistor for setting a function, and at $R_P$ is a resistance provided in the potentiometer 5 to produce a lens displacement command signal when the focus operating means 4 is manipulated. The reference characters $SW_1$ to $SW_6$ indicate switches which are interlocked with a mode selector means 19 and are operated by the mode selector means 19 to switch the respective positions. Therefore, as described hereinlater, the operation of the focus demand can be switched to and from a right-handed operation mode or mode I, a left-handed operation mode or mode II and a linear operation mode or mode III.

Figure 4:
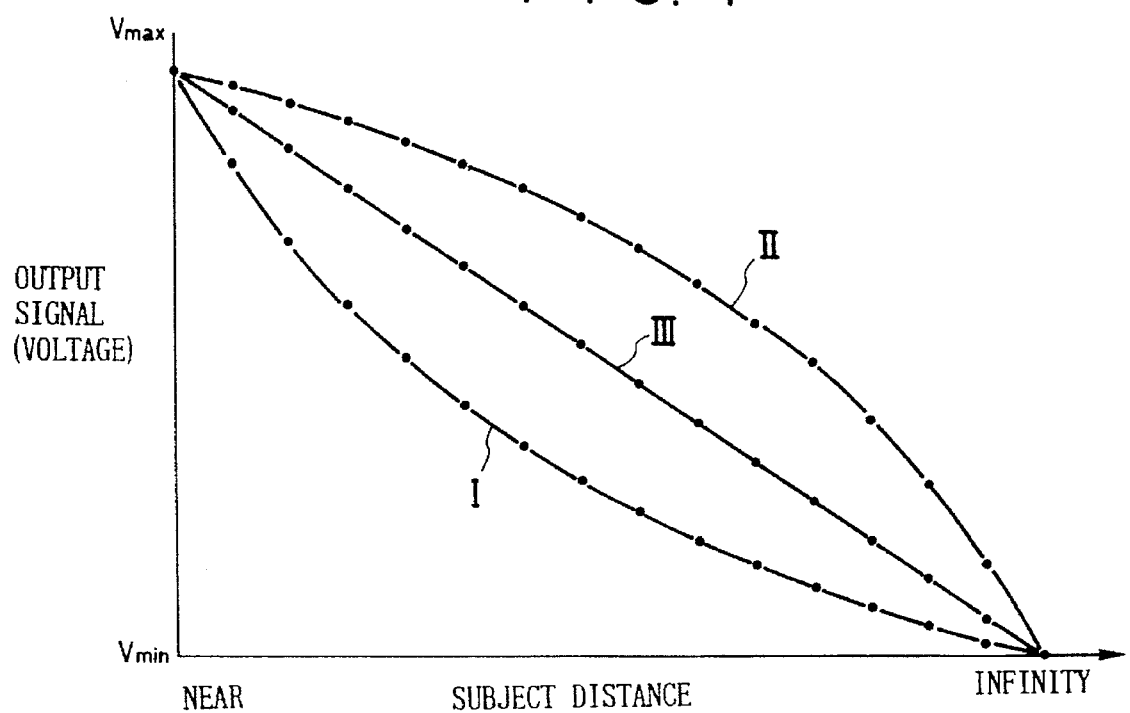
FIG. 4 is a diagram of output signal characteristics in various operation modes.

With the above-described arrangement, the output signal of the focus control device 15 is imparted with the characteristics as shown in FIG. 4 according to the extent of operating efforts on or rotational angle of the focus operating means 4 in the respective modes of operation.

More specifically, the focus demand is put in the right-handed operation mode upon closing contact $a_1$ of switch $SW_1$ on contact $b_1$, contact $a_2$ of switch $SW_2$ on contact $b_2$, contact $a_3$ of switch $SW_3$, contact $a_4$ of switch $SW_4$ on contact $b_4$, contact $a_5$ of switch $SW_5$ on contact $b_5$ and contact $a_6$ of switch $SW_6$ on contact $b_6$, respectively.

In this mode, if the focus operating means 4 is manipulated to move the focusing lens 1 toward the nearest subject distance position or toward the infinite position from the current lens position, the resistance of the potentiometer 5 is varied according to the extent of movement of the focus operating means 4 to vary its output voltage. However, since the function-setting fixed resistance $R_1$ is inserted in a stage anterior to and in series with the variable resistance $R_P$, the value of resistance is expressed as $(R_P-R_D)/(R_1+R_D)$ (where $R_P$ is the total resistance of the potentiometer and $R_D$ is the current resistance of the potentiometer 5), which varies not linearly but in a curved form. Thus, the lens displacement command signal which is produced by the potentiometer 5 is compared at the comparator 14 with the voltage signal from the common terminal 12, and the output signal of the comparator 14 is fed to the inverting amplifier 15 to obtain output signal characteristics as indicated by curve I of FIG. 4. The output signal from the output terminal of the signal characteristics converting means 8 is compared with the current lens position signal from the potentiometer 7 to detect to what extent the focus operating means has been operated in the positive direction (i.e., in the direction of the nearest subject distance position) or in the negative direction (i.e., in the direction of the infinite position), thereby obtaining a servo control signal for application to the servo means 3 which drives the focusing lens 1.

By imparting the signal characteristics as indicated by curve I of FIG. 4, the output signal of the focus demand is varied sharply relative to the extent of manipulation of the focus operating means 4 in low sensitivity focusing operations at or close to the nearest subject position on the focus curve FC. On the contrary, the output signal is varied moderately relative to the extent of operating efforts on the focus operating means 4 in high-sensitivity focusing operations at or close to the infinite position on the focus curve FC. Accordingly, the focus curve FC is suitably corrected to improve the maneuverability of the focus demand.

In case of the left-handed operation mode II, contacts $a_1$ to $a_6$ of the switches $SW_1$ to $SW_6$ are closed on contacts $c_1$ to $c_6$, respectively.

In this left-handed operation mode, the output signal characteristics similar to those in the right-handed operation mode I are obtained when the focus operating means 4 is manipulated in the opposite direction. In this case, the return output voltage of the comparator 14 and the lower limit voltage which is supplied from the lower limit terminal 11 through the resistance $R_1$ are connected to the resistance $R_P$ of the potentiometer 5 in a reversed manner as compared with the right-handed operation mode I, so that the output signal of the inverting amplifier 15 is varied as indicated by curve II of FIG. 4 in an inverse form relative to curve I. Therefore, the output signal of the inverting amplifier 14 is inverted again by another inverting amplifier 16 to obtain the output signal characteristics same as curve I.

In the right- and left-handed operation modes I and II, should the output signal drop below the lower limit voltage $V_{min}$ or exceed the upper limit voltage $V_{max}$, there might occur overrunning of the focusing lens, overloading of its servo means or collision of the focusing lens against other component parts. The upper and lower limiters 16 and 17 are provided for preventing such troubles, permitting the current to flow through diode $D_1$ or $D_2$ of the lower or upper limiter 17 or 16 when the output signal drops or increases beyond the lower or upper critical value. Consequently, there is no possibility of the output signal at the output terminal 13 overstepping the above-mentioned limit value.

Further, the focus control device is put in the linear operation mode III by closing contact $a_1$ of the switch $SW_1$ on contact $d_1$, contact $a_2$ of the switch $SW_2$ on contact $d_2$, contact $a_3$ of the switch $SW_3$ on contact $b_3$, contact $a_4$ of the switch $SW_4$ on contact $b_4$, contact as of the switch $SW_5$ on contact $d_5$, and contact $a_6$ of the switch $SW_6$ on contact $d_6$. In this linear operation mode III, the potentiometer 5 produces a signal commensurate with the extent of manipulation of the focus operating means 4 without intervention of the function-setting resistance $R_1$, so that in this case the output signal varies linearly as indicated by curve III in FIG. 4.

Although the focus demand is selectively switchable among the three operation modes in the above-described embodiment, it may be arranged exclusively for the first operation mode or the right-handed operation mode I, if desired, omitting the switches $SW_1$ to $SW_6$ and the inverting amplifier 16. Besides, the focusing operation sensor means as well as the current lens position sensor means is not necessarily required to be a potentiometer, and a sensor of other form may be employed as long as it is capable of detecting the position of the focusing lens and producing a signal indicative of the detected lens position.

Figure 5:
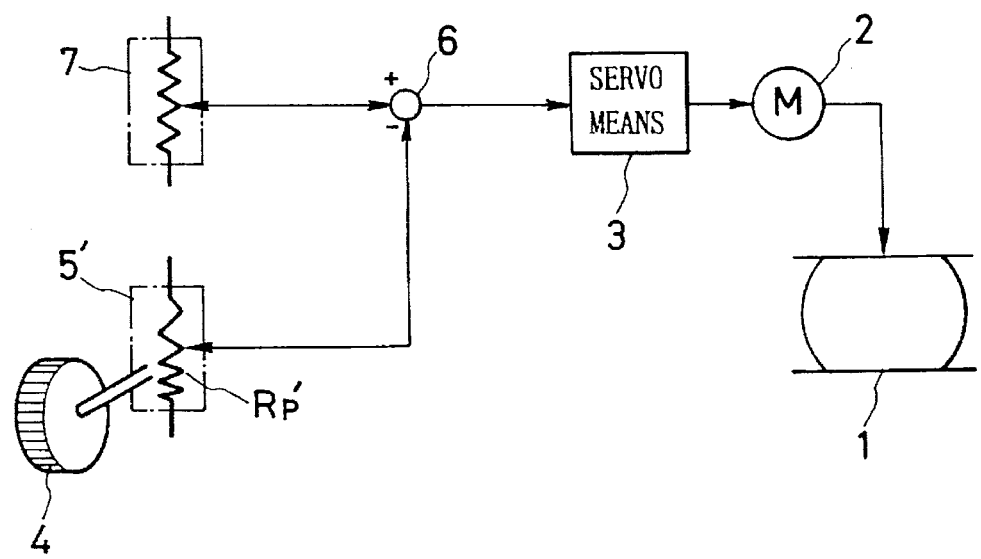
FIG. 5 is a diagrammatic illustration of a focus control device in a second embodiment of the invention.

Referring now to FIG. 5, there is illustrated a second embodiment of the invention. In this embodiment, as the signal characteristics converting means, the potentiometer 5', which produces a lens displacement signal in response to manipulation of the focus operating means 4, is arranged to vary the value of resistance of variable resistor $R_P$, of potentiometer 5' as in the fashion of an exponential function. Namely, for a given degree of manipulation of the focus operating means 4, the variable resistance $R_P$, of the potentiometer 5' is varied at a higher rate at or in the vicinity of the nearest subject distance position and at a lower rate at or in the vicinity of the infinite position. With this arrangement, the focusing lens 1 can be promptly moved to a desired position when focusing to a close subject distance in a manner similar to the above-described first embodiment. On the other hand, at or in the vicinity of the infinite position where the sensitivity to the focusing operation normally becomes very high as indicated by the steep inclination of the focus curve FC, the focusing lens 1 is moved at a lower rate relative to the extent of manipulation of the focus operating means to facilitate and permit fine focus adjustments.

Figure 6:
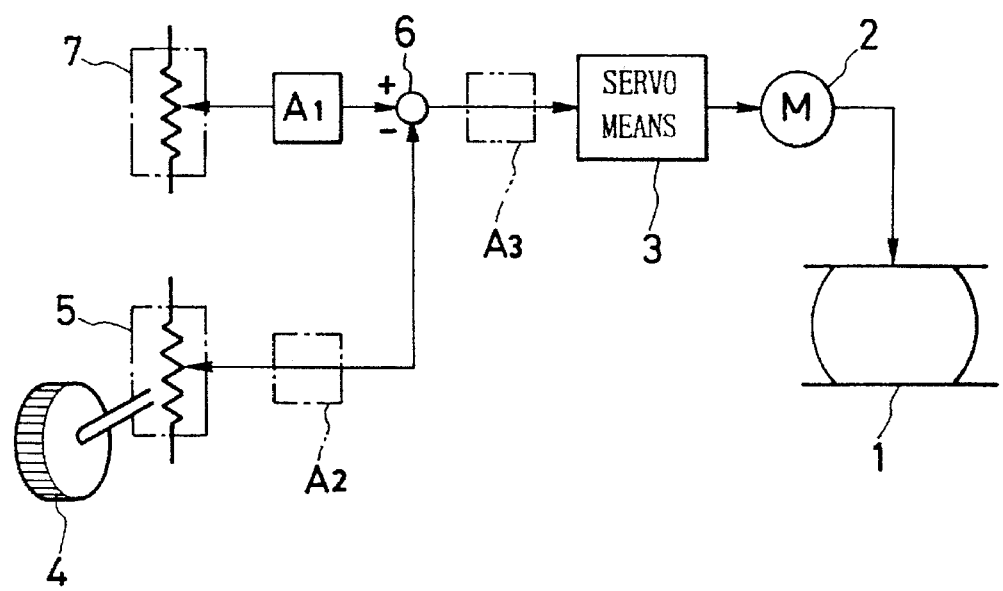
FIG. 6 is a diagrammatic illustration of a focus control device in a third embodiment of the invention.

Illustrated in FIG. 6 is a third embodiment of the invention, which is arranged to control the rate of displacement of the focusing lens 1, relative to the extent of manipulation of the focus operating means 4, along the focus curve FC by the use of an amplifier. For this purpose, the output signal of the potentiometer 5 may be amplified by an amplifier which is inserted between the potentiometer 5 and the comparator 6 as indicated by the reference $A_2$. Alternatively, the output signal of the potentiometer 7 may be amplified by an amplifier which is inserted between the potentiometer 7 and the comparator 6 as indicated by the reference $A_1$. Otherwise, an amplifier may be inserted after the comparator as indicated at $A_3$ to amplify its output signal. In case of the amplifier $A_1$ or $A_3$, its gain of amplification is varied as indicated by the characteristics curve II of FIG. 4, and in case of the amplifier $A_2$, its gain is varied as indicated by the characteristics curve I of the same figure. By so doing, the maneuverability of the focusing lens 1 can be improved in the same manner as in the foregoing first and second embodiments.

Figure 7:
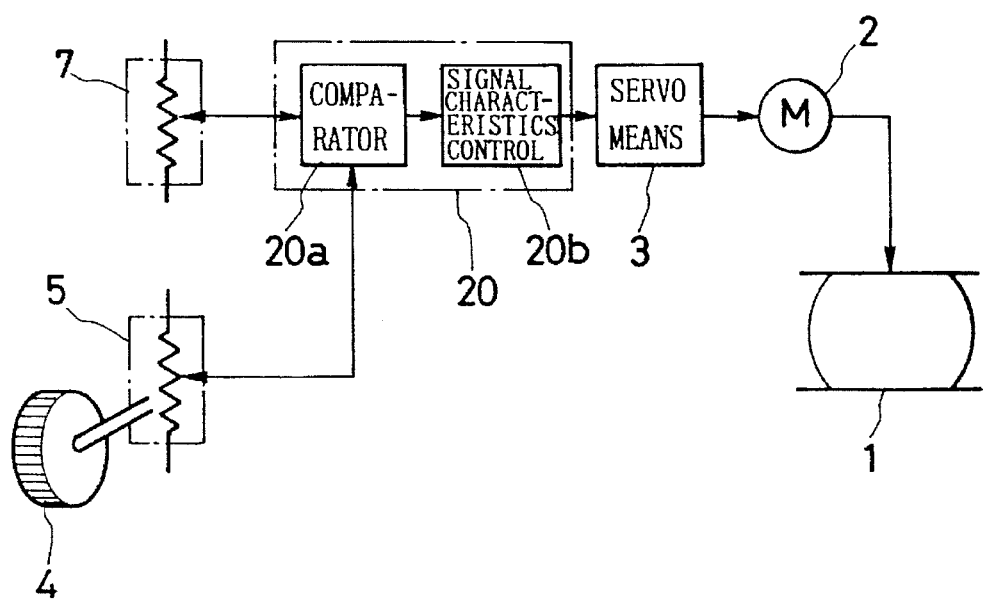
FIG. 7 is a diagrammatic illustration of a focus control device in a fourth embodiment of the invention.

Further, in place of the comparator 6, the focus demand may employ an output signal characteristics converting means 20 which is constituted by a comparator 20a adapted to compare the signals from the potentiometers 5,7 and a signal characteristics control 20b adapted to convert the characteristics of the output signal according to preset optimum focus characteristics FC on the basis of the lens position signal from the potentiometer 7 as shown in FIG. 7. Namely, the characteristic converting means is arranged to compare the output signals of the potentiometers 5 and 7 and to produce a servo control signal corresponding to predetermined focusing characteristics. The output signal characteristics converting means can be constituted, for example, by a microcomputer or the like. Thus, signals of the characteristics complying with the focus curve FC are applied to the servo means 3.

What is claimed is:

1. A focus control device comprising:

a first sensor means arranged to detect an extent of manipulation of a focus operating means to produce a lens displacement command signal;

a second sensor means arranged to detect a current position of a focusing lens within a focusing range of the lens to produce a signal indicative of a current lens position;

a comparator arranged to compare the output signals of said first and second sensor means to produce a servo control signal according to a difference between the two signals thereby to control the displacement of said focusing lens;

an output signal characteristics converting means for varying said servo control signal so that said focus operating means operates to focus the focusing lens on an object with a substantially linear response over an entire stroke range between the nearest and infinite ends of said focusing lens; and an operation mode selector means for switching a mode of operation of said focus control device to and from a first operation mode in which the output signal of said first sensor means is imparted with said output signal characteristics by the output signal characteristics converting means, a second operation mode in which the output signal of said first sensor means is inverted after imparting said output signal characteristics thereto by said output signal characteristics converting means, and a third operation mode in which the output signal of said first sensor means is sent out bypassing said output signal characteristics converting means.

2. A focus control device as defined in claim 1, wherein said output signal characteristics converting means is constituted by a function-setting means having output signal characteristics varying along a curve with high- and low-pitched inclinations toward the nearest subject distance and the infinite end of the focusing range, respectively.

3. A focus control device as defined in claim 2, wherein said function-setting means is constituted by a function-setting fixed resistance connected in series with a variable resistance of a potentiometer.

4. A focus control device as defined in claim 2, wherein, as said output signal characteristics converting means, said first sensor means is constituted by a potentiometer arranged to produce an output signal complying with said characteristics curve by varying the value of resistance at a greater rate toward the nearest subject distance position and at a smaller rate toward the infinite position of the focusing range relative to a given extent of manipulation of said focus operating means.

5. A focus control device as defined in claim 1, wherein said output signal characteristics converting means is constituted by an amplifier having, as control signal characteristics for said comparator, a gain curve varying as an exponential function of the extent of manipulation of said focus operating means continuously over the entire focusing range from the nearest subject distance to infinite.

6. A focus control device as defined in claim 1, wherein said output signal characteristics converting means comprises means for varying said servo control signal exponentially as a function of the focusing lens position continuously over the entire focusing range from the nearest subject distance to an infinite subject distance.

* * * * *